United States Patent
Swope et al.

(10) Patent No.: US 11,538,179 B2
(45) Date of Patent: Dec. 27, 2022

(54) DEPTH-BASED DATA CAPTURE SYSTEM CONFIGURATION

(71) Applicant: ZEBRA TECHNOLOGIES CORPORATION, Lincolnshire, IL (US)

(72) Inventors: Charles Burton Swope, Coral Springs, FL (US); Stanko Jelavic, Davie, FL (US); Miguel X. Gines, Deerfield, FL (US); Paul Seiter, Port Jefferson Station, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 200 days.

(21) Appl. No.: 16/800,780

(22) Filed: Feb. 25, 2020

(65) Prior Publication Data
US 2021/0264629 A1    Aug. 26, 2021

(51) Int. Cl.
*G06T 7/579* (2017.01)
*G06T 7/80* (2017.01)
*G06T 7/90* (2017.01)

(52) U.S. Cl.
CPC .............. *G06T 7/579* (2017.01); *G06T 7/80* (2017.01); *G06T 7/90* (2017.01)

(58) Field of Classification Search
CPC .............. G06T 7/579; G06T 7/90; G06T 7/80
See application file for complete search history.

(56) References Cited

U.S. PATENT DOCUMENTS

| | | | |
|---|---|---|---|
| 2014/0120319 A1* | 5/2014 | Joseph | G01B 11/25 428/172 |
| 2015/0371430 A1* | 12/2015 | Brewington | G06T 19/20 345/428 |
| 2016/0301260 A1* | 10/2016 | Russell | H04N 13/243 |
| 2017/0011555 A1* | 1/2017 | Li | G06T 1/60 |
| 2017/0039756 A1* | 2/2017 | Moule | H04N 5/74 |
| 2017/0299435 A1* | 10/2017 | Rhoads | A61B 5/0075 |
| 2017/0347079 A1* | 11/2017 | Wang | G06T 7/521 |
| 2019/0212450 A1* | 7/2019 | Steinberg | G01S 17/42 |
| 2019/0370990 A1* | 12/2019 | Swope | G06T 17/00 |
| 2020/0195900 A1* | 6/2020 | Sodhi | H04N 5/23299 |
| 2020/0225354 A1* | 7/2020 | Schindler | G01S 7/4816 |
| 2020/0234490 A1* | 7/2020 | Rezaiifar | G06T 7/50 |
| 2020/0413016 A1* | 12/2020 | Sodhi | H04N 9/3188 |

* cited by examiner

*Primary Examiner* — Molly Wilburn

(57) ABSTRACT

A data capture system for object dimensioning includes: a projector to project a structured light pattern onto a capture volume to illuminate an object in the capture volume; a depth sensor; a set of image sensors; and a processor configured to: responsive to detection of the object, control the depth sensor to obtain a depth scan of the object; based on the depth scan, determine an attribute of the object; select projection parameters based on the attribute; control the projector to illuminate the object according to the projection parameters; and control the set of image sensors to capture respective images of the object.

18 Claims, 6 Drawing Sheets

DEPTH-BASED DATA CAPTURE SYSTEM CONFIGURATION

BACKGROUND

The transportation and storage of objects such as packages may require knowledge of the dimensions of a package. Such information may be employed to optimize the use of available space in a container (e.g. a trailer), to determine a shipping or storage cost for the package, or the like. Package dimensions, however, may not be known in advance, and workers may therefore be required to obtain package dimensions by manually measuring the packages. Taking manual measurements can be time-consuming and error-prone. Systems for automatically measuring package dimensions may also suffer from reduced accuracy, for example, when measuring packages in motion, packages with dark (e.g. black) surfaces, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
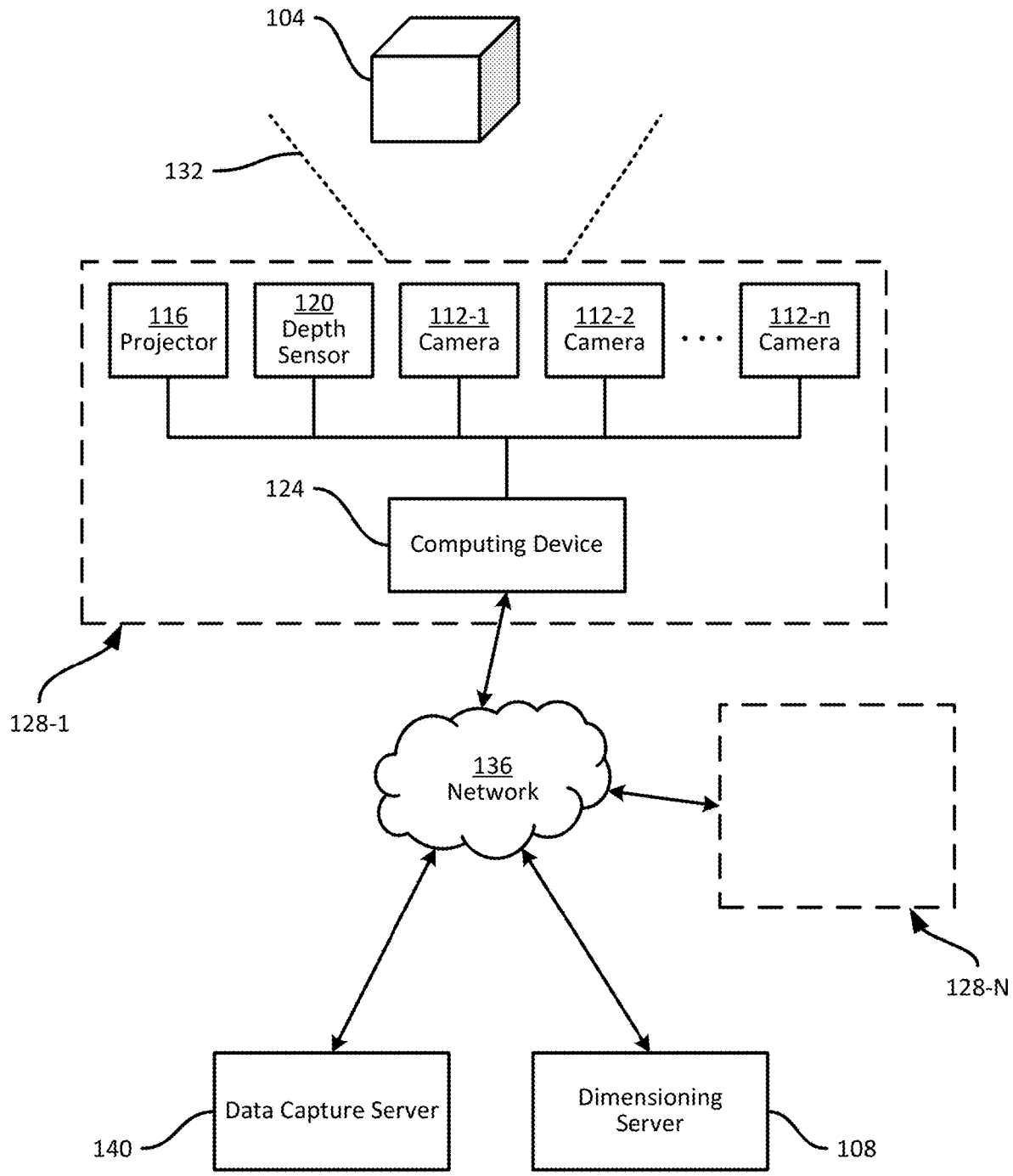
FIG. 1 is a block diagram of an example data capture system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a data capture system for object dimensioning, comprising: a projector to project a structured light pattern onto a capture volume to illuminate an object in the capture volume; a depth sensor; a set of image sensors; and a computing device configured to: responsive to detection of the object, control the depth sensor to obtain a depth scan of the object; based on the depth scan, determine an attribute of the object; select projection parameters based on the attribute; control the projector to illuminate the object according to the projection parameters; and control the set of image sensors to capture respective images of the object.

Additional examples disclosed herein are directed to a method of data capture for object dimensioning, the method comprising: responsive to detection of an object in a capture volume, controlling a depth sensor to obtain a depth scan of the object; based on the depth scan, determining an attribute of the object; selecting projection parameters based on the attribute; controlling a projector to illuminate the object according to the projection parameters; and controlling a set of image sensors to capture respective images of the object.

FIG. 1 depicts a data capture system for object dimensioning. The data capture system is configured to capture image data depicting an object 104 within a capture volume defined by the data capture system. The image data (e.g. a set of two-dimensional images captured substantially simultaneously) can be processed to generate a point cloud representing the object 104 to be dimensioned. Dimensions for the object 104 can then be determined, for example by a dimensioning server 108, based on the point cloud.

The data capture system includes a plurality of image sensors 112-1, 112-2, . . . 112-*n*. The image sensors 112 may also be referred to as cameras 112. The data capture system also includes a projector 116 (in other examples, multiple projectors 116 may be employed) and a depth sensor 120 (in other examples, depth sensors 120 may be employed). The projector 116 is controllable to project a structured light pattern onto the capture volume, to illuminate the object 104. The structured light pattern can be selected to be readily detectable in images captured by the cameras 112, to facilitate generation of the point cloud mentioned above.

The depth sensor 120 can be a depth camera, such as a time-of-flight (TOF) camera, a lidar sensor, or a combination thereof. As will be discussed below in greater detail, the depth sensor 120 is employed to determine certain attributes of the object 104 prior to image capture by the cameras 112. Based on the attributes determined using the depth sensor 120, configuration parameters can be selected for either or both of the projector 116 and the cameras 112.

The data capture system also includes a computing device 124 connected with the cameras 112, the projector 116 and the depth sensor 120. The computing device 124 can control the cameras 112, the projector 116 and the depth sensor 120, and can select the above-mentioned configuration parameters, for example based on rules at the computing device 124. The computing device 124 can also generate a point cloud from the images captured by the cameras 112.

As shown in FIG. 1, the cameras 112, the projector 116, the depth sensor 120, and the computing device 124 are components of a capture subsystem 128-1. The data capture system may include a plurality of capture subsystems 128, an example 128-N of which is also shown in FIG. 1. In other words, the data capture system can include a plurality of subsystems 128 (e.g. four, although greater and smaller numbers of subsystems 128 can also be deployed). Each subsystem 128 may provide coverage, via a field of view (FOV) 132 of the cameras 112, of a portion of the capture volume, such that the subsystems 128 together provide full coverage of the capture volume.

The computing device 124, as well as the respective computing devices of other subsystems 128, can generate point cloud data from the images captured by the corresponding cameras 112. The partial point clouds generated by each computing device 124 can be provided, e.g. via a network 136, to a data capture server 140. The data capture server 140, in turn, can combine the point clouds received from each subsystem 128 to generate a combined point cloud, from which the object 104 can be extracted and dimensioned by the dimensioning server 108. The dimensioning server 108, for example, can be configured to process the point cloud and determine at least one dimension (e.g. height, width, length or the like) of the object 104.

Figure 2:
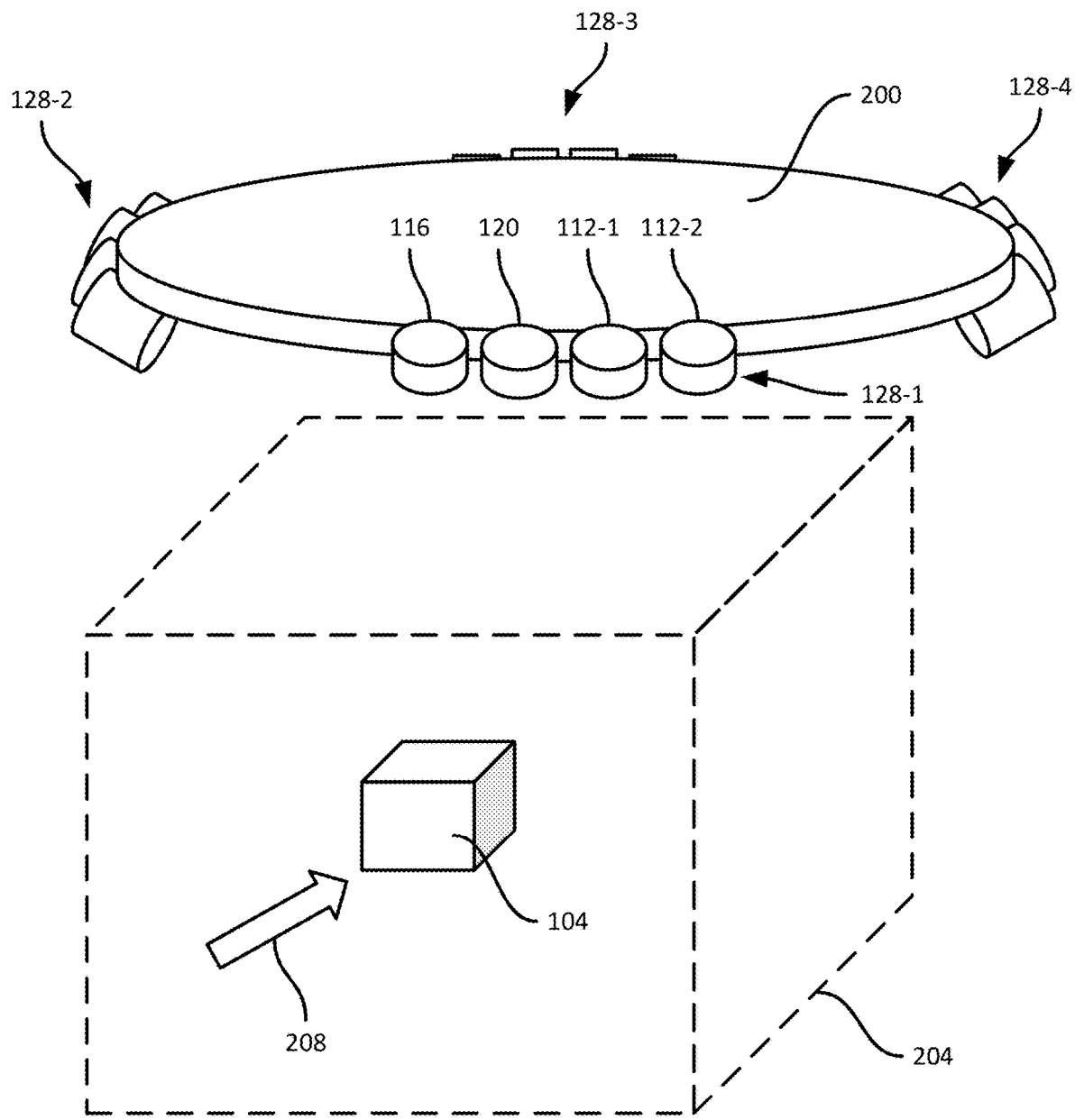
FIG. 2 is a diagram illustrating an example implementation of the data capture system of FIG. 1.

Turning to FIG. 2, certain components of the data capture system are shown in an example deployment. The example deployment shown in FIG. 2 includes four subsystems 128-1, 128-2, 128-3 and 128-4, each including cameras 112-1 and 112-2, a projector 116, and a depth sensor 120 (as illustrated in connection with the subsystem 128-1). The components of each subsystem 128-1 illustrated in FIG. 2, as well as the corresponding computing device 124, can be enclosed in respective housings in some implementations.

The subsystems 128 can be supported on a support structure 200 (e.g. about the perimeter of the support structure 200), such as a substantially annular frame, which may be suspended from a ceiling (not shown) of the facility in which the data capture system is deployed. A wide variety of other support structures may also be employed to support the subsystems 128, including discrete support structures for each subsystem 128, or for each subsystem 128. In some examples, a truss structure may extend from the floor or walls adjacent to the capture volume 204 to support the components of the system.

As noted above, the cameras 112 of the subsystems 128 are positioned by the support structure 200 such that the field of view of each camera 112 encompasses at least a portion of a capture volume 204, such as a 10×10×10 foot volume. Further, the fields of view of adjacent cameras 112 within each subsystem 128 overlap, e.g. by about 40%. Together, the cameras 112 thus provide substantially complete coverage of the capture volume 204 (e.g. each position in the capture volume 204 is within the field of view of at least two cameras 112). In the present example, the capture volume 208 has a height, a width and a length of about eight feet each; the cameras 112 may be arranged to encompass various other capture volumes in other embodiments, for example depending on the size of the object 104 to be captured.

The object 104 may be transported through the capture volume 204, e.g. in the direction 208 via any suitable locomotive mechanism. Example locomotive mechanisms include a forklift or other vehicle, a conveyor belt, and the like. The data capture system 100 is configured to detect when the object 104 has entered the capture volume 204, and in response to such detection, to control components thereof in order to configure the projectors 116 and cameras 112, capture images with the cameras 112, and generate point cloud data.

Before a detailed discussion of the operation of the data capture system, certain internal components of the computing device 124 will be discussed with reference to FIG. 3.

Figure 3:
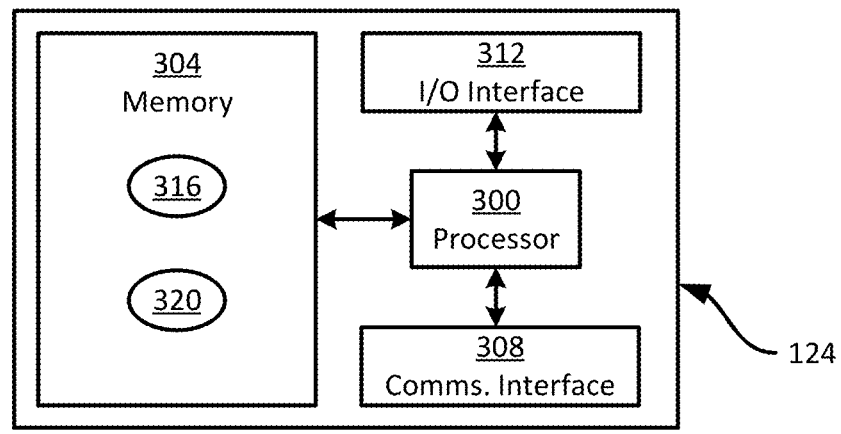
FIG. 3 is a block diagram of certain internal hardware components of the computing device of FIG. 1.

Referring to FIG. 3, certain internal components of the computing device 124 are shown. The computing device 124 includes a central processing unit (CPU), also referred to as a processor 300, interconnected with a non-transitory computer readable storage medium, such as a memory 304. The memory 304 includes any suitable combination of volatile memory (e.g. Random Access Memory (RAM)) and non-volatile memory (e.g. read only memory (ROM), Electrically Erasable Programmable Read Only Memory (EEPROM), flash) memory. The processor 300 and the memory 304 each comprise one or more integrated circuits (ICs).

The computing device 124 also includes a communications interface 308, enabling the computing device 124 to exchange data with other computing devices, such as the dimensioning server 108 and the data capture server 140, via the network 136. The communications interface 308 therefore includes any suitable hardware (e.g. transmitters, receivers, network interface controllers and the like) allowing the computing device 124 to communicate over the network 136.

The computing device 124 further includes an input/output interface 312, which may also be referred to as a local communications interface, enabling the computing device 124 to exchange data with devices such as the cameras 112, projector 116 and depth sensor 120. In the present example, the interface 312 includes a universal serial bus (USB) interface. The interface 312 can also include a discrete device, such as a USB hub, connected to the computing device 124. Other suitable interface technologies may also be employed for the interface 312, including Ethernet, Wi-Fi, Thunderbolt™ and the like.

The computing device 124 can also include input devices (e.g. a keyboard, a mouse, a microphone, or the like) and output devices (e.g. a display, a speaker or the like), not shown. The components of the computing device 124 are interconnected by communication buses (not shown), and powered by a battery or other power source, over the above-mentioned communication buses or by distinct power buses (not shown).

The memory 304 of the computing device 124 stores a plurality of applications, each including a plurality of computer readable instructions executable by the processor 300. The execution of the above-mentioned instructions by the processor 300 causes the computing device 124 to implement certain functionality, as discussed herein. The applications are therefore said to be configured to perform that functionality in the discussion below. In the present example, the memory 304 of the computing device 124 stores a capture configuration application 316, and a point cloud generator application 320 (also referred to herein simply as the applications 316 and 320, respectively).

The computing device 124 is configured, via execution of the application 316 by the processor 300, to control the depth sensor 120 to capture a depth scan of the object 104 and to select configuration parameters for at least one of the projector 116 and the cameras 112. Having selected the configuration parameters, the computing device 124 controls the cameras 112 to capture a set of images (e.g. simultaneously with illumination of the object 104 with the projector 116), and initiates execution of the application 320 to generate point cloud data based on the captured images. The application 320 is a suitable photogrammetry and/or point cloud generation application. As will be apparent to those skilled in the art, generation of the point cloud via execution of the application 320 can be based on calibration data that defines the physical positions of the cameras 112 relative to one another and relative to the capture volume 204.

The applications 316 and 320 can, in other examples, be implemented as a single application, or as more than two applications. In other examples, the processor 300, as configured by the execution of the applications 316 and 320, is implemented as one or more specifically-configured hardware elements, such as field-programmable gate arrays (FPGAs) and/or application-specific integrated circuits (ASICs).

Figure 4:
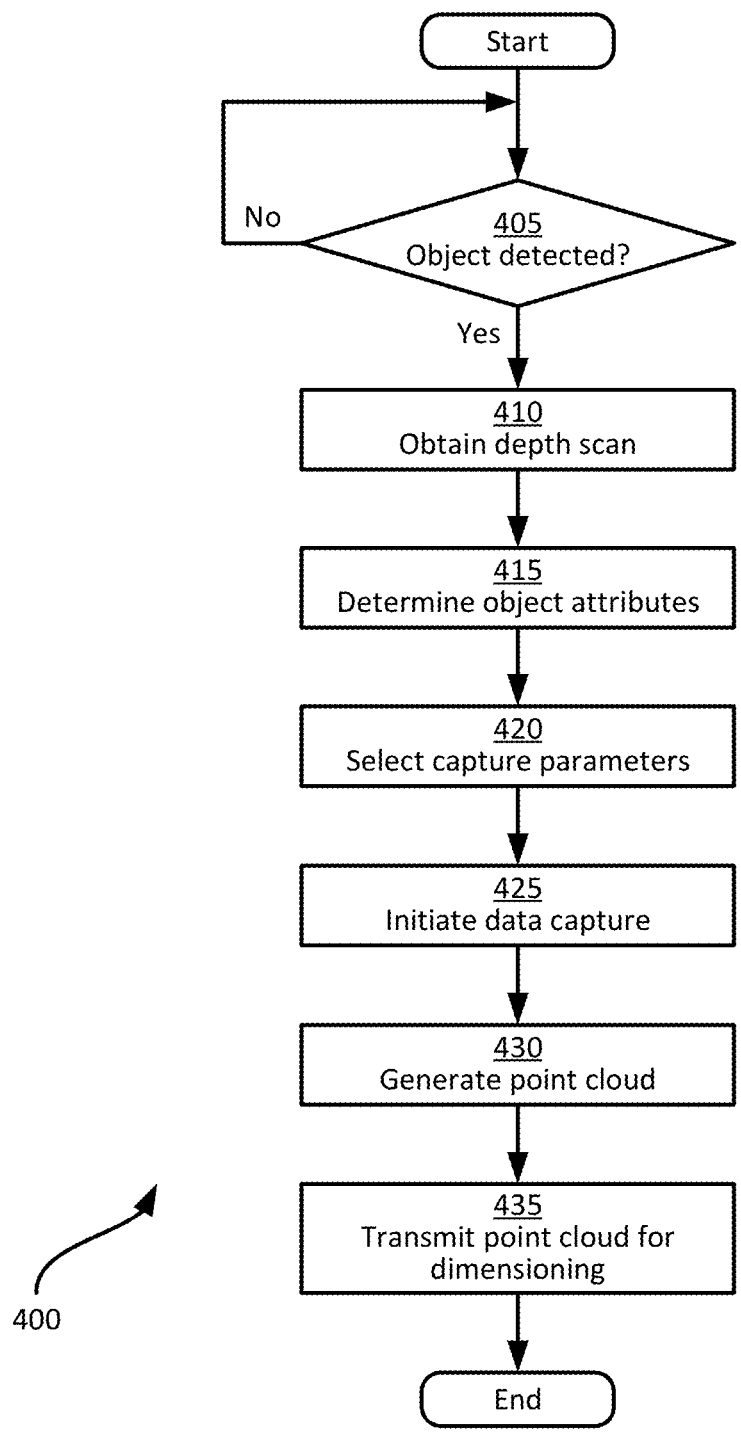
FIG. 4 is a flowchart of a data capture method for object dimensioning.

Turning now to FIG. 4, a method 400 of data capture for object dimensioning is illustrated. The method 400 will be described in conjunction with its performance in the data capture system shown in FIGS. 1 and 2. In particular, the method 400 illustrates actions taken by the computing device 124 to configure the cameras 112 and/or projector 116 and capture images of the object 104 within the capture volume 204.

At block 405, the computing device 124 is configured to determine whether an object (e.g. the object 104) is detected within the capture volume 204, or adjacent to the capture volume 204. In some examples, the computing device 124 controls at least one of the cameras 112 to capture a sequence of images (e.g. a video stream), and processes the sequence of images to detect objects in motion therein. When the processing indicates that an object has entered the capture volume 204, or is approaching the capture volume 204, the determination at block 405 is affirmative. In other examples, the depth sensor 120 itself can be employed for object detection instead of, or in addition to, the cameras 112 as described above.

In further examples, the determination at block 405 includes determining whether a detection signal has been received at the computing device 124, e.g. from the data capture server 140. For example, the data capture system can include a detection sensor such as a lidar sensor, an IR beam sensor or the like that is triggered when the object 104 enters the capture volume 204. The data capture server 140 can be connected to the detection sensor, and can send the detection signal to the computing device 124 when such triggering is detected.

When the determination at block 405 is negative, the computing device 124 continues monitoring for an object detection at block 405. When the determination at block 405 is affirmative, however, the computing device 124 proceeds to block 410.

At block 410, the computing device 124 controls the depth sensor 120 to obtain a depth scan of at least a portion of the capture volume 204 (e.g. the portion falling within a field of view of the depth sensor 120). While the images captured by the cameras 112 enable the generation of a point cloud with sufficient resolution to dimension the object 104 to an accuracy of, for example, less than one inch of error, the depth scan obtained via the depth sensor 120 may have lower resolution than mentioned above. That is, the depth scan need not be relied upon for dimensioning. Instead, as will be discussed below, the depth scan is employed to select configuration parameters for the cameras 112 and/or projector 116 to improve the accuracy of the point cloud used for dimensioning.

The depth scan obtained at block 410 includes a set of depth measurements. The depth measurements may form a point cloud (albeit generally more sparse than the point cloud generated from the images captured by the cameras 112). In other examples, the computing device 124 discards portions of the depth measurements, such that the depth scan includes only the minimum range detected by the depth sensor 120, representing the closest point of any object in the capture volume 204 to the depth sensor 120.

At block 415, the computing device 124 is configured to determine at least one attribute of the object 104. The attributes determined at block 415 depend in part on the type and capabilities of the depth sensor 120. For example, when the depth sensor 120 is implemented as a lidar device, the computing device 124 can determine coarse dimension measurements for the object 104, e.g. at least one of a height, a width and a length. For example, turning to FIG. 5, an object 504 is shown having a height "H", a width "W" and a length "L". The computing device 104 can also be configured to determine only a subset of the above-mentioned dimensions. For example, the height H may be determined, while the width and length W and L may be omitted. In further examples, as noted above, a minimum distance "D" between the object 104 and the depth sensor 120 may be determined. As will be apparent, the distance D is inversely proportional to the height H, and is therefore indicative of the height H.

The computing device 124 may also determine, at block 415, shape-related attributes of the object 104. For example, based on the depth scan, the computing device 124 may determine whether the object 104 includes curved surfaces, planar surfaces, or a combination thereof.

When the computing device 124 determines dimensions of the object 104 or 504, the computing device 124 may also select one of a set of predefined classes based on the dimensions. For example, the computing device 124 can store predefined dimensional ranges that correspond to "small", "medium" and "large" objects. For example, objects with a height of less than two feet may be classified as small, objects with a height between two and five feet may be classified as medium, and objects with a height greater than five feet may be classified as large.

When the depth sensor 120 is capable of capturing color data as well as depth measurements, the computing device 124 can also determine color-related attributes at block 415. Examples of color-related attributes include an average color of the object 104 or 504, a selection of a color class based on the average color, or the like. For example, the computing device 124 can store predefined color ranges each corresponding to a given class (e.g. red objects, dark objects, and the like). The attributes determined at block 415 can therefore include a selection of one of the above classes.

Further examples of attributes determined at block 415 are a position of the object 104 or 504 within the capture volume 204, as well as an orientation of the object 104 or 504, a velocity of the object 104 or 504, and the like. Still further attributes determined at block 415 that are associated with the object 104 or 504 include an ambient light level in the capture volume 204. Ambient light may be characterized by either or both of intensity and color, each of which may be employed in selecting data capture configuration parameters subsequently in the method 400.

At block 420, the computing device 124 is configured to select capture parameters based on the attribute(s) determined at block 415. In general, the capture parameters selected at block 420 include configuration parameters for at least one of the projector 116 and the cameras 112. As will be apparent to those skilled in the art, different projector and/or camera configurations may lead to improved image quality depending on the attributes of the object 104 or 504 (e.g. the size, shape and color of the object 104 or 504).

Figure 5:
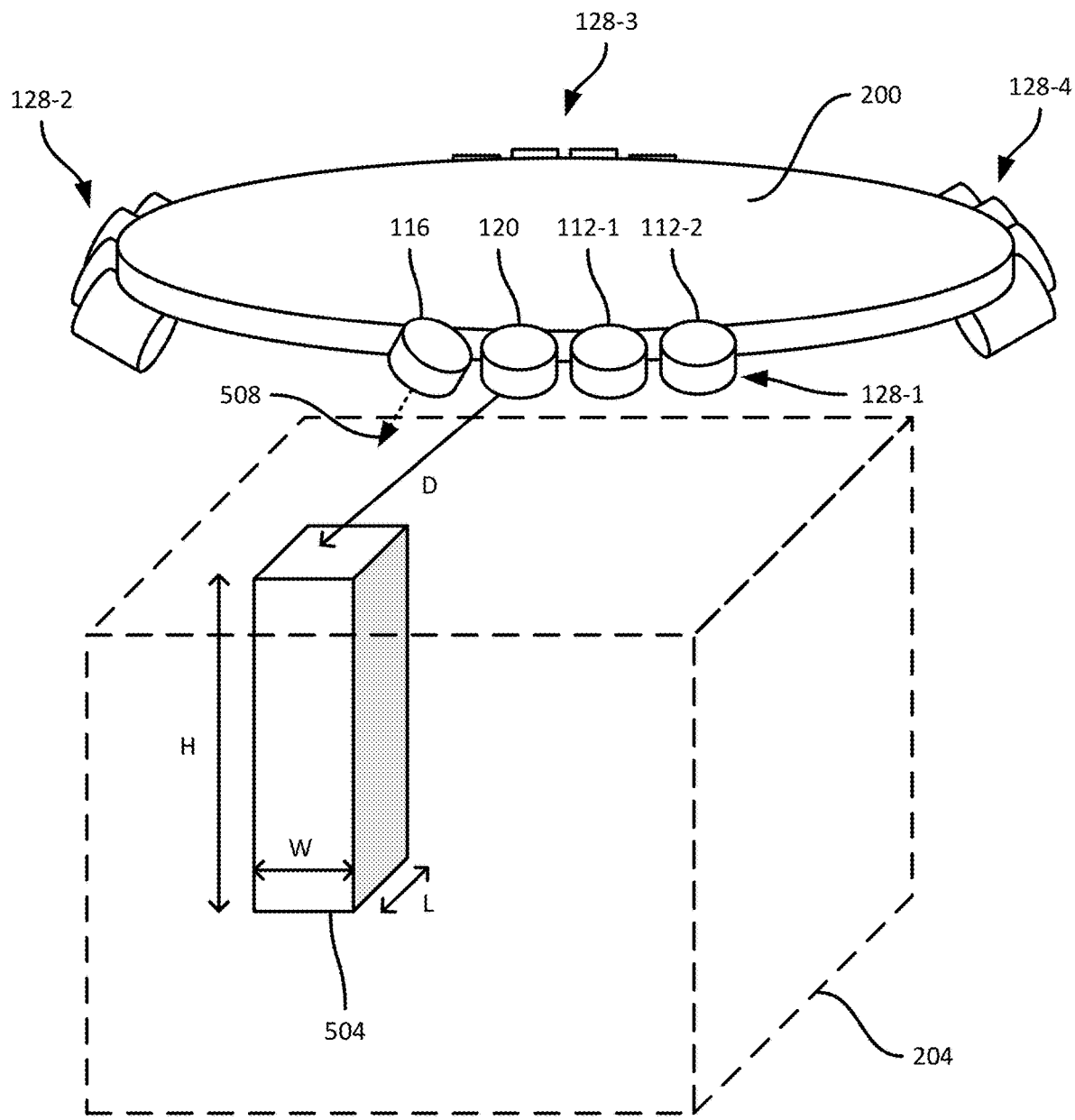
FIG. 5 is a diagram illustrating an example implementation of the data capture system of FIG. 1.

Examples of projection parameters that may be selected at block 420 include a projector intensity, a focal length defining a distance from the projector 116 at which the structured light pattern is focused, a structured light pattern, and a projector orientation. For example, the projector intensity can be reduced as the height of the object 104 or 504 increases. A greater height of the object 104 or 504, as illustrated in FIG. 5, indicates that a portion of the object 504 is closer to the projector 116. Reducing the intensity of the projector 116 may therefore reduce the likelihood of images captured by the cameras 112 being overexposed due to the illumination of the projector 116.

Projector intensity may also be selected based on object color. For example, for an object that has been classified as being darkly colored, the computing device 124 may increase projector intensity. Projector intensity and/or color can also be selected based on ambient light attributes detected at block 415. For example, greater ambient intensity may lead to the selection of increased projector intensity.

As also illustrated in FIG. 5, the projector 116 may be supported on a movable mount, e.g. with one or more servos controllable by the computing device 124 to set a direction 508 in which the projector 116 emits light. The computing device 124 can select an orientation of the projector 116 based on a detected position of the object 504, such that the direction 508 is aimed towards the position of the object 504.

In further examples, the computing device 124 can select from a plurality of stored structured light patterns (e.g. stored in the memory 304) based on any combination of the color, size and shape attributes determined at block 415. For example, when the object 104 or 504 includes curved surfaces, a first structured light pattern (e.g. a grid of lines) may be selected. When the object 104 or 504 does not include curved surfaces, however, a second structured light pattern (e.g. a grid of discrete points of light) may be selected. Different structured light patterns may also be selected based on object color. For example, image capture quality of darker objects may be improved via use of a different structured light pattern than lighter objects.

In further examples, at block 420 the computing device 124 selects, in addition to or instead of the projection parameters mentioned above, at least one image capture parameter based on the attribute(s) determined at block 415. Examples of image capture parameters include focal length, aperture size, and shutter speed. For example, image capture parameters may be adjusted based on ambient lighting conditions (e.g. with shutter speed being increased for greater ambient light intensity, white balance being adjusted based on ambient light color, and the like). Further, in some examples the computing device 124 can select to activate or deactivate certain cameras 112, e.g. based on the position of the object 104 or 504 within the capture volume 204. The image capture parameters selected at block 420 can therefore also include an active set of the cameras 112.

As will be apparent, certain object attributes may correspond to contradictory configuration adjustments. For example, while increased object height may correspond to lower projector intensity, darker object color may correspond to higher projector intensity. The computing device 124 can store, e.g. in the memory 304, a prioritization of attributes indicating which adjustments take precedence. In other examples, the computing device 124 can process all detected attributes, and sum the resulting adjustments to capture parameters. For example, an object classified as "large" corresponds to an increased intensity for the projector 116. However, the object may also have a light color, which may correspond to a reduced projector intensity. The computing device 124 can be configured to sum the above adjustments and therefore select an intermediate projector intensity.

Returning to FIG. 4, at block 425 the computing device 124 is configured to control the projector 116 to illuminate the capture volume 204 according to the capture parameters selected at block 420. The computing device 124 is also configured to control the cameras 112 (e.g. the active set selected at block 420, if applicable) to capture images simultaneously with illumination of the capture volume 204 by the projector 116. In some examples, prior to performing block 425, the computing device 124 awaits a further detection signal. For example, when the detection at block 405 is that the object 104 or 504 is approaching the capture volume 204, at block 425 the computing device 124 can await a detection that the object 104 or 504 has entered the capture volume 204.

At block 430, having captured a set of images of the object 104 or 504, the computing device 124 is configured to generate a point cloud from the images, representing at least a portion of the object 104 or 504. As will be apparent, the method 400 may also be performed by the respective computing devices of other subsystems 128, and therefore each computing device 124 may generate point cloud data representing a portion of the object 104 or 504. The point cloud data may be generated at block 430 via execution of the application 320.

At block 435, the computing device 124 can be configured to transmit the point cloud generated at block 430 for dimensioning. For example, the point cloud can be transmitted to the data capture server 140, which also receives point clouds from the other subsystems 128 and combines the point clouds into a single point cloud representation of the capture volume. The combined point cloud may then be transmitted to the dimensioning server 108, which is configured to detect and dimension the object 104 or 504.

Figure 6:
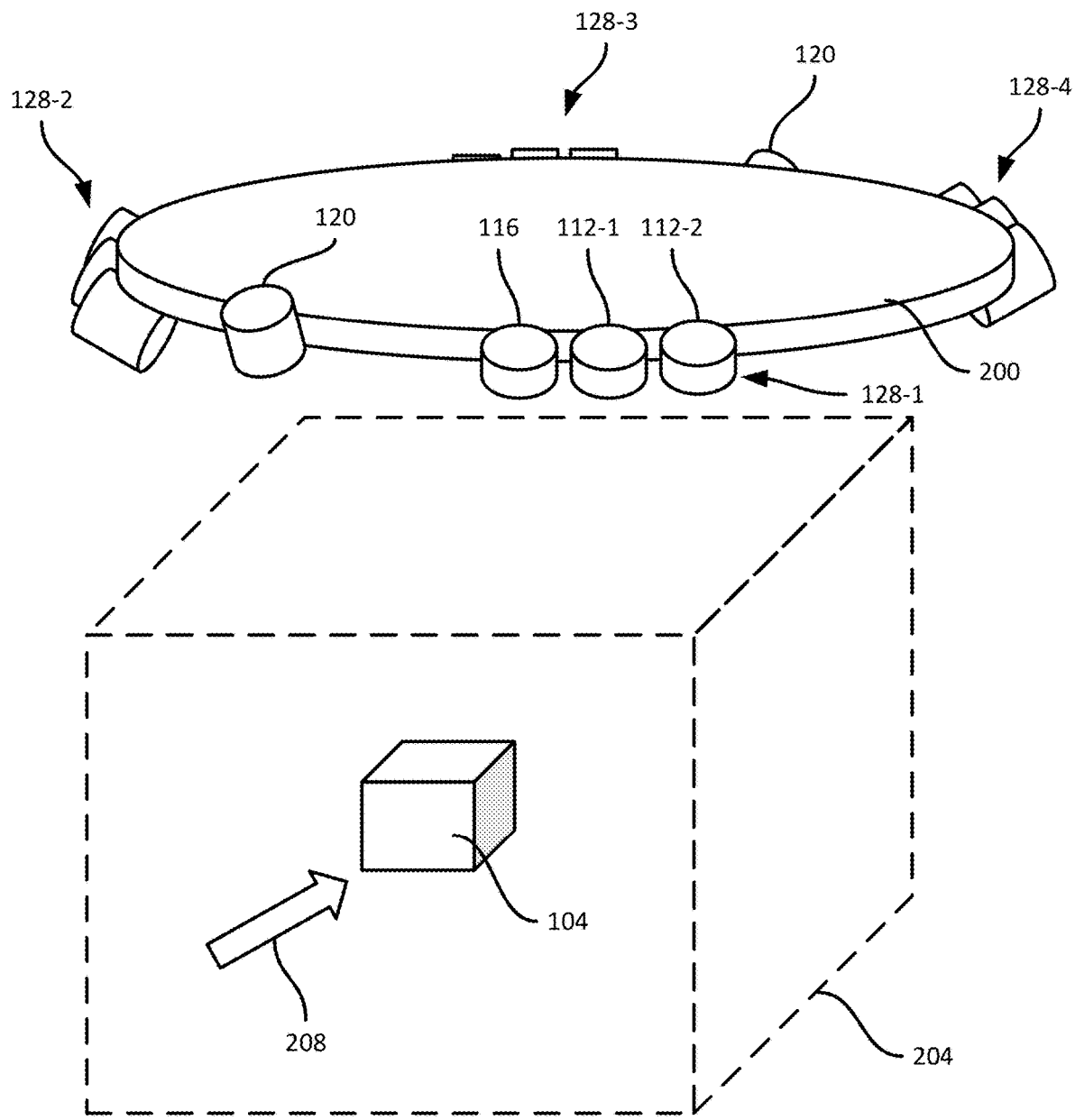
FIG. 6 a diagram illustrating another example implementation of the data capture system of FIG. 1.

Variations to the above systems and methods are contemplated. In some implementations, the depth sensor 120 is deployed independently of the subsystems 128. For example, as shown in FIG. 6, rather than each subsystem 128 including a depth sensor 120, the data capture system as a whole may include a set of depth sensors (e.g. two are shown in FIG. 6), arranged to capture substantially the whole capture volume 204 together. The depth sensors 120 may be controlled by any one of the computing devices 124 of the subsystems 128, or by the data capture server 140. In this implementation, the data capture server 140 itself may also be responsible for the selection of capture parameters, which are then conveyed to the computing devices 124 for control of the cameras 112 and projector(s) 116.

In further examples, the projection parameters selected at block 420 can include, for a given projector 116, a plurality of distinct projection parameters for each of several regions within the field of view of the projector 116. That is, some projectors 116 may be enabled to apply different illumination intensities, structured light patterns, and the like, over different portions of their fields of view. The computing device 124 may therefore, at block 420, select a plurality of regions of the capture volume 204 and select projection parameters for each region. For example, if the object 104 or 504 has distinct surfaces with contrasting colors, the computing device 124 may select different projection parameters for each of the regions in the capture volume corresponding to those surfaces.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A data capture system for object dimensioning, comprising:
   a projector to project a structured light pattern onto a capture volume to illuminate an object in the capture volume;
   a depth sensor;
   a set of image sensors; and
   a computing device configured to:
      responsive to detection of the object, control the depth sensor to obtain a depth scan of the object;
      based on the depth scan, determine an attribute of the object;
      select projection parameters based on the attribute by selecting one of a predefined set of classes according to the attribute, and selecting the projection parameters corresponding to the selected class;
      control the projector to illuminate the object according to the projection parameters; and
      control the set of image sensors to capture respective images of the object.

2. The data capture system of claim 1, wherein the computing device is further configured to: generate a point cloud representing the object based on the images, for transmission to a dimensioning server.

3. The data capture system of claim 1, wherein the depth sensor includes at least one of a lidar device and a time-of-flight camera.

4. The data capture system of claim 1, wherein the depth scan includes depth measurements and color data.

5. The data capture system of claim 1, wherein the attribute of the object includes at least one of a dimension, a shape, a color and a position.

6. The data capture system of claim 1, wherein the predefined set of classes include dimension ranges.

7. The data capture system of claim 1, wherein the projection parameters include at least one of illumination intensity, focal length, orientation, and structured light pattern type.

8. The data capture system of claim 1, wherein the computing device is further configured to: select image capture parameters for the set of image sensors, according to the attribute of the object.

9. The data capture system of claim 8, wherein the image capture parameters include at least one of focal length, shutter speed, and aperture size.

10. A method of data capture for object dimensioning, the method comprising:
   responsive to detection of an object in a capture volume, controlling a depth sensor to obtain a depth scan of the object;
   based on the depth scan, determining an attribute of the object;
   selecting projection parameters based on the attribute by selecting one of a predefined set of classes according to the attribute, and selecting the projection parameters corresponding to the selected class;

controlling a projector to illuminate the object according to the projection parameters; and controlling a set of image sensors to capture respective images of the object.

11. The method of claim 10, further comprising: generating a point cloud representing the object based on the images, for transmission to a dimensioning server.

12. The method of claim 10, wherein the depth sensor includes at least one of a lidar device and a time-of-flight camera.

13. The method of claim 10, wherein the depth scan includes depth measurements and color data.

14. The method of claim 10, wherein the attribute of the object includes at least one of a dimension, a shape, a color and a position.

15. The method of claim 10, wherein the predefined set of classes include dimension ranges.

16. The method of claim 10, wherein the projection parameters include at least one of illumination intensity, focal length, orientation, and structured light pattern type.

17. The method of claim 10, further comprising: selecting image capture parameters for the set of image sensors, according to the attribute of the object.

18. The method of claim 17, wherein the image capture parameters include at least one of focal length, shutter speed, and aperture size.

* * * * *